(12) United States Patent
Dudar et al.

(10) Patent No.: US 9,140,627 B2
(45) Date of Patent: Sep. 22, 2015

(54) COOLING FAN ASSISTED ENGINE-OFF NATURAL VACUUM TEST

(71) Applicant: Ford Global Technologies, LLC, Dearborn, MI (US)

(72) Inventors: Aed M. Dudar, Canton, MI (US); Robert Roy Jentz, Westland, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 14/066,540

(22) Filed: Oct. 29, 2013

(65) Prior Publication Data

US 2015/0120133 A1   Apr. 30, 2015

(51) Int. Cl.
| F02M 65/00 | (2006.01) |
| G01M 3/32 | (2006.01) |
| G01M 17/007 | (2006.01) |
| F02M 25/00 | (2006.01) |

(52) U.S. Cl.
CPC .............. *G01M 17/007* (2013.01); *F02M 25/00* (2013.01); *F02M 65/00* (2013.01); *F02M 65/006* (2013.01)

(58) Field of Classification Search
USPC ........................................................ 701/34.4
See application file for complete search history.

(56) References Cited

U.S. PATENT DOCUMENTS

| 1,365,567 | A | * | 1/1921 | Thomson | 123/518 |
| 3,364,727 | A | * | 1/1968 | Heath | 73/19.01 |
| 3,374,639 | A | * | 3/1968 | Burke et al. | 62/53.2 |
| 3,820,382 | A | * | 6/1974 | Andres et al. | 73/40.7 |
| 4,100,758 | A | * | 7/1978 | Mayer | 62/47.1 |
| 4,202,385 | A | * | 5/1980 | Voelz et al. | 141/59 |
| 5,216,914 | A | * | 6/1993 | Horner | 73/49.2 |
| 5,715,799 | A | | 2/1998 | Blomquist et al. | |
| 6,974,251 | B2 | | 12/2005 | DeRonne et al. | |
| 6,983,641 | B1 | * | 1/2006 | Perry et al. | 73/37 |
| 8,074,627 | B2 | | 12/2011 | Siddiqui | |
| 8,371,272 | B1 | | 2/2013 | Martin et al. | |
| 8,418,530 | B1 | * | 4/2013 | Scaringe et al. | 73/40.7 |

(Continued)

FOREIGN PATENT DOCUMENTS

WO    0186135 A1    11/2001

OTHER PUBLICATIONS

Deronne, M. et al., "The Development and Implementation of an Engine Off Natural Vacuum Test for Diagnosing Small Leaks in Evaporative Emissions Systems," SAE Technical Paper Series 2003-01-0719, 2003 SAE World Congress, Detroit MI., Mar. 3-6, 2003, 13 pages.

(Continued)

*Primary Examiner* — Shelley Chen
(74) *Attorney, Agent, or Firm* — James Dottavio; Alleman Hall McCoy Russell & Tuttle LLP

(57) ABSTRACT

A method for a vehicle fuel system, comprising: during an engine-off condition, including an ambient temperature within a threshold range, operating a cooling fan to increase a fuel tank vacuum; and indicating leaks in the vehicle fuel system based on the increased vacuum. In this way, an EONV test may be run at mild ambient temperatures which would not otherwise result in the development of adequate fuel tank vacuum to pass the EONV test.

17 Claims, 5 Drawing Sheets

(56) References Cited

U.S. PATENT DOCUMENTS

| | | | |
|---|---|---|---|
| 8,955,370 B1* | 2/2015 | Thornberg et al. | 73/49.3 |
| 2007/0017291 A1* | 1/2007 | Cypes et al. | 73/590 |
| 2008/0147241 A1* | 6/2008 | Tsangaris et al. | 700/273 |
| 2009/0277249 A1* | 11/2009 | Polster et al. | 73/40.7 |
| 2009/0277251 A1* | 11/2009 | Takakura | 73/40.7 |
| 2011/0139130 A1* | 6/2011 | Siddiqui | 123/520 |
| 2011/0168140 A1* | 7/2011 | DeBastos et al. | 123/521 |
| 2012/0152210 A1 | 6/2012 | Reddy et al. | |

OTHER PUBLICATIONS

Reddy, S., "Understanding and Designing Automotive Evaporative Emission Control Subjects," SAE International Technical Paper 2012-01-1700, 9 pages.

* cited by examiner

COOLING FAN ASSISTED ENGINE-OFF NATURAL VACUUM TEST

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

Evaporative leaks may be identified using engine-off natural vacuum (EONV) during conditions when a vehicle engine is not operating. In particular, a fuel system may be isolated at an engine-off event. The pressure in such a fuel system will increase if the tank is heated further (e.g. from hot exhaust or a hot parking surface) as liquid fuel vaporizes. As a fuel tank cools down, a vacuum is generated therein as fuel vapors condense to liquid fuel. Vacuum generation is monitored and leaks identified based on expected vacuum development or expected rates of vacuum development. The EONV leak test may be monitored for a period of time based on an available battery charge.

However, the EONV leak test is prone to false failures based on customer driving and parking habits. For example, a refueling event that fills the fuel tank with relatively cool liquid fuel followed by a short ensuing trip may fail to heat the fuel bulk mass and result in a false fail if an EONV test is run. Further, the rates of vacuum development are based in part on the ambient temperature. During mild weather conditions, the ambient temperature may restrict the amount of heating or cooling of the fuel tank following engine shut-off, and thus limit the rate of pressure or vacuum development. As such, vacuum may not reach expected threshold levels in the time allotted for the EONV test based on available battery charge. This may result in a false-fail condition, leading to potentially unnecessary engine service.

The inventors herein have realized the above issues, and developed systems and methods to at least partially address the problems. In one example, a method for a vehicle fuel system, comprising: during an engine-off condition, including an ambient temperature within a threshold range, operating a cooling fan to increase a fuel tank vacuum; and indicating leaks in the vehicle fuel system based on the increased vacuum. In this way, an EONV test may be run at mild ambient temperatures which would not otherwise result in the development of adequate fuel tank vacuum to pass the EONV test. Implementing this method increases the robustness of the EONV test.

In another example, a method for a vehicle fuel system, comprising: sealing a fuel tank and monitoring a fuel tank pressure after an engine-off event; and in response to a change in fuel tank pressure during a monitoring period being less than a fuel tank pressure threshold, unsealing the vehicle fuel system and allowing the fuel tank pressure to equilibrate to atmospheric pressure; assessing an ambient temperature; in response to the ambient temperature being within a threshold range, sealing the vehicle fuel system; and operating a cooling fan to increase a fuel tank vacuum to identify leaks in the vehicle fuel system. In this way, the occurrence of false EONV test failures due to insufficient vacuum developing may be reduced. This in turn, will reduce unnecessary vehicle warranty care.

In yet another example, a vehicle system, comprising: an engine including an intake; a fuel system including a fuel tank, a fuel vapor canister, a first valve coupling the fuel vapor canister to the intake, and a second valve coupling the fuel vapor canister to atmosphere; a pressure sensor coupled to the fuel tank for estimating a fuel tank pressure; a temperature sensor externally coupled to the vehicle system for estimating ambient temperature; an engine cooling system including one or more cooling fans; and a control system including executable instructions stored in non-transitory memory for: during an engine-off condition, in response to an ambient temperature being within a threshold temperature range; closing the first valve and the second valve; activating the one or more cooling fans; and monitoring a fuel tank vacuum for a vacuum test duration to identify leaks in the fuel system. In this way, EONV test restrictions based on stored battery charge may be avoided. EONV tests may be limited to monitoring vacuum development for a duration (e.g. 45 minutes) in order to maintain sufficient battery charge to restart the vehicle. This system increases the chances that a sufficient vacuum will develop following engine shut-off to correctly assess the presence of fuel system leaks within the testing duration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 1:
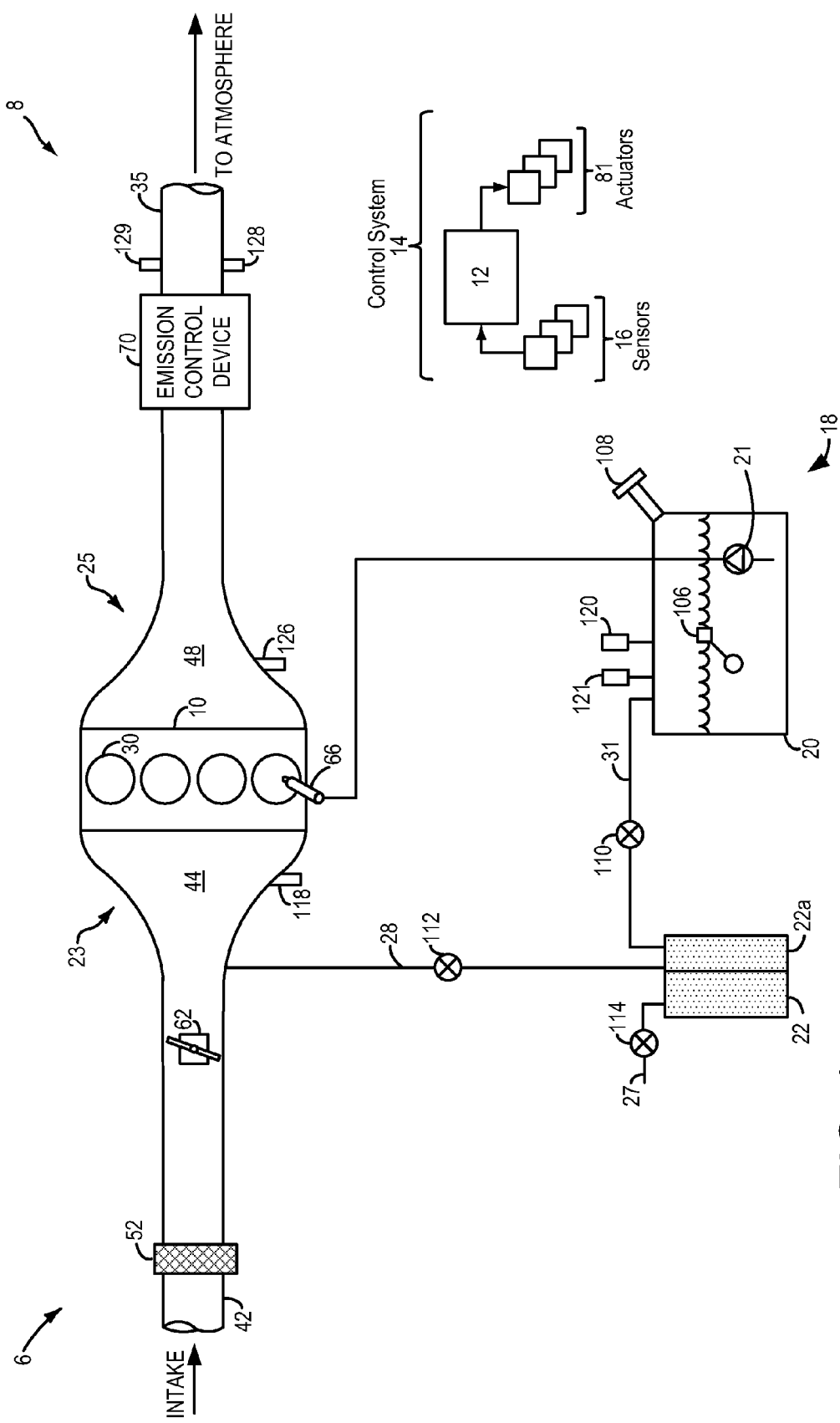
FIG. 1 shows a schematic depiction of a fuel system coupled to an engine system.
Figure 2:
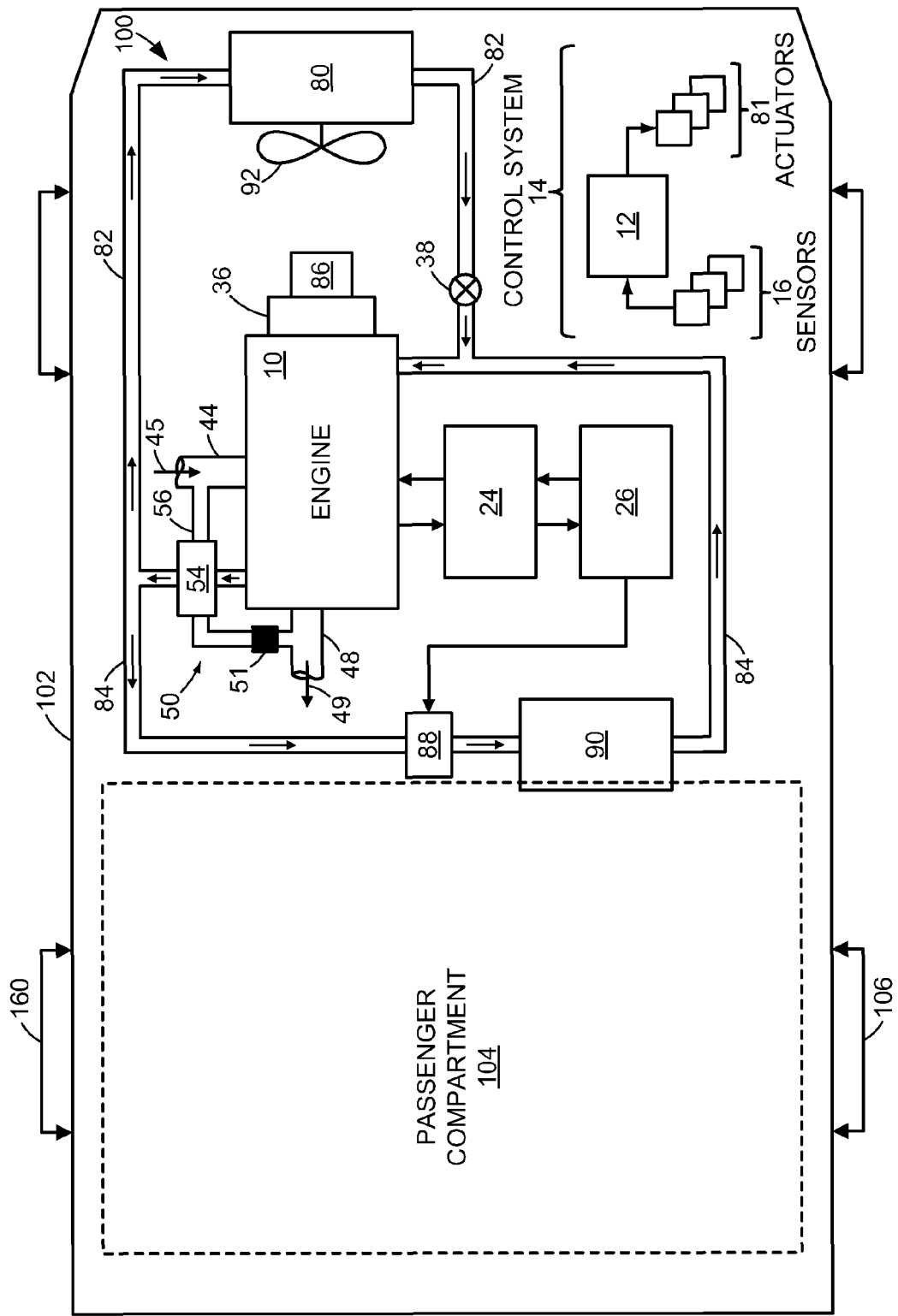
FIG. 2 shows a schematic depiction of a cooling system for a hybrid vehicle system.

This description relates to systems and methods for leak testing of a fuel system coupled to an engine, such as the fuel system and engine system depicted in FIG. 1. As shown in FIG. 2, the fuel system and engine system may be included in a hybrid vehicle, and may be further coupled to a cooling system including one or more cooling fans. A controller, or power train control module (PCM) may be configured to perform a control routine for an engine-off natural vacuum (EONV) test, such as the method depicted in FIG. 3. The method may include activating the cooling system depicted in FIG. 2 to aid in developing a vacuum in a fuel tank at predetermined temperatures. Example EONV leak tests are described with regards to FIGS. 4A, 4B, and 5. In this way, EONV leak tests may be performed over a wide range of ambient temperatures with a reduced risk of false-fail indications.

FIG. 1 shows a schematic depiction of a hybrid vehicle system 6 that can derive propulsion power from engine system 8 and/or an on-board energy storage device, such as a battery system (see FIG. 2 for a schematic depiction). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIG. 3.

Controller 12 may also be configured to intermittently perform leak detection routines on fuel system 18 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, or a system with leaks of a predetermined size.

Turning now to FIG. 2, an example embodiment of a cooling system 100 in a motor vehicle 102 is illustrated schematically. Cooling system 100 circulates coolant through internal combustion engine 10 and exhaust gas recirculation (EGR) cooler 54 to absorb waste heat and distributes the heated coolant to radiator 80 and/or heater core 90 via coolant lines 82 and 84, respectively.

In particular, FIG. 2 shows cooling system 100 coupled to engine 10 and circulating engine coolant from engine 10, through EGR cooler 54, and to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in the cooling line 82, which may be kept closed until the coolant reaches a threshold temperature.

Further, fan 92 may be coupled to radiator 80 in order to maintain an airflow through radiator 80 when vehicle 102 is moving slowly or stopped while the engine is running. In some examples, fan speed may be controlled by controller 12. Alternatively, fan 92 may be coupled to engine-driven water pump 86.

As shown in FIG. 2, engine 10 may include an exhaust gas recirculation (EGR) system 50. EGR system 50 may route a desired portion of exhaust gas from exhaust manifold 48 to intake manifold 44 via EGR passage 56. The amount of EGR provided to intake manifold 44 may be varied by controller 12 via EGR valve 51. Further, an EGR sensor (not shown) may be arranged within EGR passage 56 and may provide an indication of one or more of pressure, temperature, and concentration of the exhaust gas. Alternatively, the EGR may be controlled based on an exhaust oxygen sensor and/or and intake oxygen sensor. Under some conditions, EGR system 50 may be used to regulate the temperature of the air and fuel mixture within the combustion chamber. EGR system 50 may further include EGR cooler 54 for cooling exhaust gas 49 being reintroduced to engine 10. In such an embodiment, coolant leaving engine 10 may be circulated through EGR cooler 54 before moving through coolant line 82 to radiator 80.

After passing through EGR cooler 54, coolant may flow through coolant line 82, as described above, and/or through coolant line 84 to heater core 90 where the heat may be transferred to passenger compartment 104, and the coolant flows back to engine 10. In some examples, engine-driven pump 86 may operate to circulate the coolant through both coolant lines 82 and 84. In other examples, such as the example of FIG. 2 in which vehicle 102 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running, as will be described in further detail below. Like engine-driven pump 86, auxiliary pump 88 may be a centrifugal pump; however, the pressure (and resulting flow) produced by pump 88 may be proportional to an amount of power supplied to the pump by energy storage device 26.

In this example embodiment, the hybrid propulsion system includes an energy conversion device 24, which may include a motor, a generator, among others and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 160, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12 (described below).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 160. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

Figure 3:
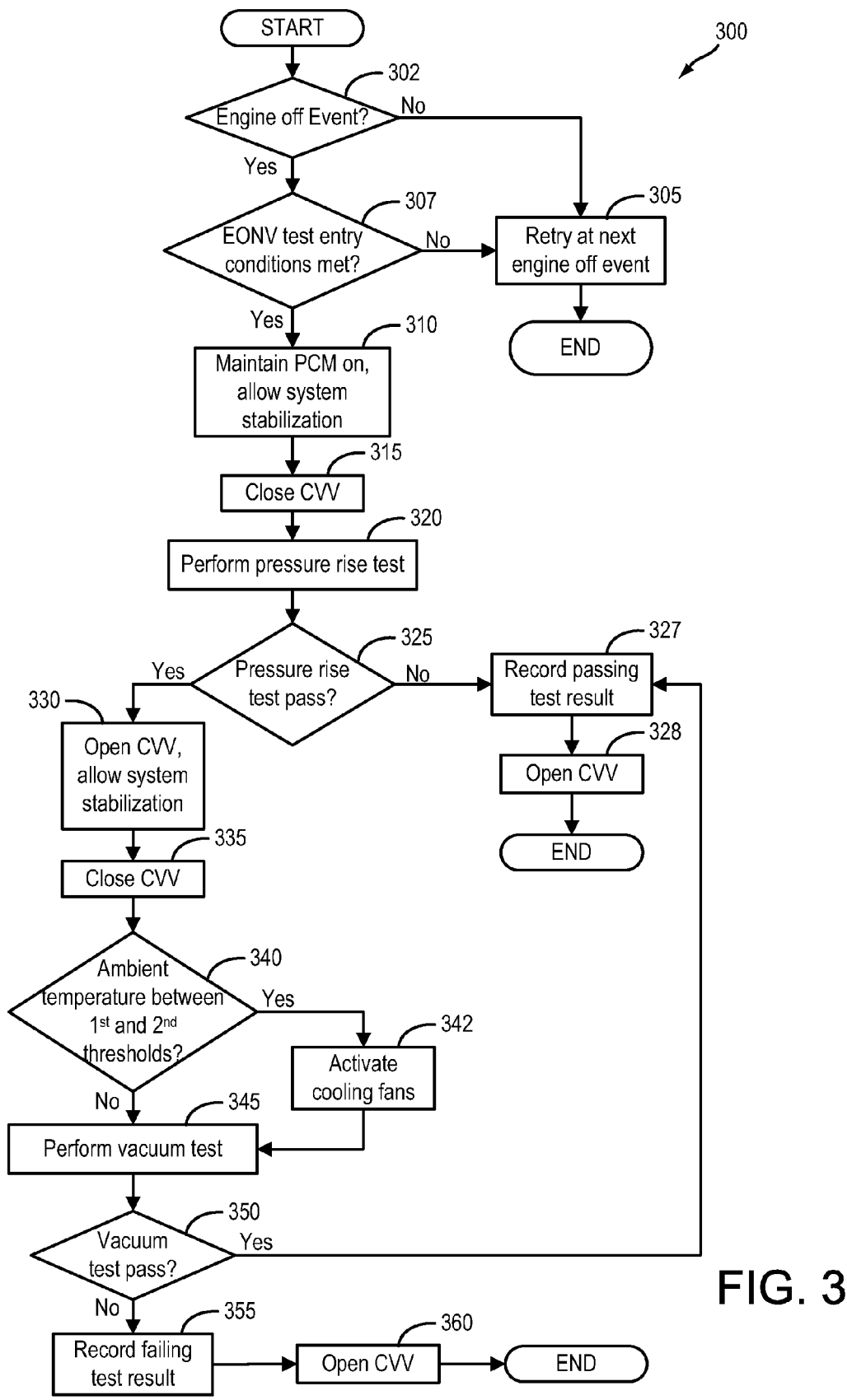
FIG. 3 shows a high level flow chart for a method that may be implemented for performing an engine-off natural vacuum test.

FIG. 3 depicts a high-level method 300 for an engine-off natural vacuum test. Method 300 will be described with relation to the systems depicted in FIGS. 1 and 2, but it should be understood that similar methods may be used with other systems without departing from the scope of this disclosure. Method 300 may be carried out by controller 12.

Method 300 may begin at 302. At 302, method 300 may include determining whether an engine-off event has occurred. If no engine-off event is detected, method 300 may proceed to 305. At 305, method 300 may include recording that an EONV test was aborted, and setting a flag to retry the EONV test at the next detected engine-off event. Method 300 may then end. If an engine-off event is detected, method 300 may proceed to 307.

At 307, method 300 may include determining whether entry conditions for an EONV test are met. Entry conditions may include a threshold amount of time passed since the previous EONV test, a threshold length of engine run time prior to the engine-off event, a threshold amount of fuel in the fuel tank, and a threshold battery state of charge. For hybrid electric, plugin-hybrid electric, and other vehicles capable of being powered during an engine-off event, the entry conditions may also include a vehicle-off condition. If entry conditions are not met, method 300 may proceed to 305. At 305, method 300 may include recording that an EONV test was aborted, and setting a flag to retry the EONV test at the next detected engine-off event. Method 300 may then end. If entry conditions are met, method 300 may proceed to 310.

Although entry conditions may be met at the beginning of method 300, this may change during the execution of the method. For example, an engine restart or refueling event may be sufficient to abort the method at any point prior to completing method 300. If such events are detected that would interfere with the performing of method 300 or the interpretation of results derived from executing method 300, method 300 may proceed to 305, record that an EONV test was aborted, and set a flag to retry the EONV test at the next detected engine-off event, and then end.

Continuing at 310, method 300 may include maintaining the PCM on despite the engine-off and/or vehicle off condition. In this way, the method may continue to be carried out by controller 12. Method 300 may further include allowing the fuel system to stabilize following the engine-off condition. Allowing the fuel system to stabilize may include waiting for a period of time before method 300 advances. The stabilization period may be a pre-determined amount of time, or may be an amount of time based on current operating conditions. In some examples, the stabilization period may be characterized as the length of time necessary for consecutive measurements of a parameter to be within a threshold of each other. For example, fuel may be returned to the fuel tank from other fuel system components following an engine off condition. The stabilization period may thus end when two or more consecutive fuel level measurements are within a threshold amount of each other, signifying that the fuel level in the fuel tank has reached a steady-state. In some examples, the stabilization period may end when the fuel tank pressure is equal to atmospheric pressure. Following the stabilization period, method 300 may proceed to 315.

At 315, method 300 may include closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open. Method 300 may then proceed to 320.

At 320, method 300 may include performing a pressure rise test. While the engine is still cooling down post shut-down, there may be additional heat rejected to the fuel tank. With the fuel system sealed via the closing of the CVV, the pressure in the fuel tank may rise due to fuel volatizing with increased temperature. The pressure rise test may include monitoring fuel tank pressure for a period of time. Fuel tank pressure may be monitored until the pressure reaches a threshold, the threshold pressure indicative of no leaks above a threshold size in the fuel tank. The threshold pressure may be based on the current conditions, including the ambient temperature, the fuel level, the fuel volatility, etc. In some examples, the rate of pressure change may be compared to an expected rate of pressure change. The fuel tank pressure may not reach the threshold pressure. Rather the fuel tank pressure may be monitored for a predetermined amount of time, or an amount of time based on the current conditions. The fuel tank pressure may be monitored until consecutive measurements are within a threshold amount of each other, or until a pressure measurement is less than the previous pressure measurement. The fuel tank pressure may be monitored until the fuel tank temperature stabilizes. Method 300 may then proceed to 325.

At 325, method 300 may include determining whether the pressure rise test ended due to a passing result, such as the fuel tank pressure reaching a pressure threshold. If the pressure rise test resulted in a passing result, method 300 may proceed to 327. At 327, method 300 may include recording the passing test result. Continuing at 328, method 300 may include opening the canister vent valve. In this way, the fuel tank pressure may be returned to atmospheric pressure. Method 300 may then end.

If the pressure rise test did not result in a pass, method 300 may proceed to 330. At 330, method 300 may include opening the CVV and allowing the system to stabilize. Opening the CVV allows the fuel tank pressure to return to atmospheric pressure. The system may be allowed to stabilize until the fuel tank pressure reaches atmospheric pressure, or until consecutive pressure readings are within a threshold of each other. Method 300 may then proceed to 335.

At 335, method 300 may include closing the CVV. In this way, the fuel tank may be isolated from atmosphere. As the fuel tank cools, the fuel vapors should condense into liquid fuel, creating a vacuum within the sealed tank. Continuing at 340, method 300 may include assessing the ambient (external) temperature, and determining whether the ambient temperature is between a first temperature threshold and a second temperature threshold. The first temperature threshold may be a higher temperature threshold, and may be indicative of ambient conditions that should produce a passing result on a pressure rise test. The second temperature threshold may be a lower temperature threshold, and may be indicative of ambient conditions that should produce a passing result on a vacuum test. Temperatures between the first and second temperature thresholds may be indicative of ambient conditions likely to produce failing results on both pressure rise and vacuum test, for example mild temperature conditions where a vacuum may not develop within the time allotted for an EONV test (e.g. 45 minutes).

If the ambient temperature does not fall between the first and second temperature thresholds, method 300 may proceed to 345. If the ambient temperature falls between the first and second temperature thresholds, method 300 may proceed to

342. At 342, method 300 may include activating engine cooling fans. In this way, the temperature of the fuel tank can be decreased faster than it would in the ambient conditions, thereby decreasing the chance of a false-fail result. In some embodiments, the fuel tank may be cooled in other ways, such as by circulating coolant through a cooling jacket coupled to the fuel tank.

At 345, method 300 may include performing a vacuum test. Performing a vacuum test may include monitoring fuel tank pressure for a period of time. Fuel tank pressure may be monitored until the vacuum reaches a threshold, the threshold vacuum indicative of no leaks above a threshold size in the fuel tank. The threshold vacuum may be based on the current conditions, including the ambient temperature, the fuel level, the fuel volatility, etc. In some examples, the rate of pressure change may be compared to an expected rate of pressure change. The fuel tank pressure may not reach the threshold vacuum. Rather the fuel tank pressure may be monitored for a predetermined amount of time, or an amount of time based on the current conditions.

Continuing at 350, method 300 may include determining whether a passing result was indicated for the vacuum test, such as the fuel tank vacuum reaching a pressure threshold. If the vacuum test resulted in a passing result, method 300 may proceed to 327. At 327, method 300 may include recording the passing test result. Continuing at 328, method 300 may include opening the canister vent valve. If the cooling fans were turned on to assist fuel tank vacuum development, they may be shut off. In this way, the fuel tank pressure may be returned to atmospheric pressure. Method 300 may then end.

If the vacuum test did not result in a passing result, method 300 may proceed to 355. At 355, method 300 may include recording the failing test result. Continuing at 360, method 300 may include opening the canister vent valve. In this way, the fuel tank pressure may be returned to atmospheric pressure. If the cooling fans were turned on to assist fuel tank vacuum development, they may be shut off. Method 300 may then end.

The systems described herein and depicted in FIGS. 1 and 2, and the method described herein and depicted in FIG. 3 may enable one or more methods. In one example, a method for a vehicle fuel system, comprising: during an engine-off condition, including an ambient temperature within a threshold range, operating a cooling fan to increase a fuel tank vacuum; and indicating leaks in the vehicle fuel system based on the increased vacuum. Operating the cooling fan to increase the fuel tank vacuum may include operating the cooling fan for a first test duration, the first test duration based on an amount of stored battery charge. The method may further comprise: in response to a fuel tank vacuum increasing above a vacuum threshold during the first test duration, indicating that no leak has been detected. In some examples, the method may further comprise: in response to a fuel tank vacuum failing to reach a vacuum threshold during the first test duration, indicating that a leak has been detected. The method may further comprise: following an engine-off event, sealing the vehicle fuel system and monitoring a fuel tank pressure for a second test duration. In some examples, the method may further comprise: in response to the fuel tank pressure increasing above a pressure threshold during the second test duration, indicating that no leak has been detected. The method may further comprise: in response to the fuel tank pressure failing to reach a pressure threshold during the second test duration, unsealing the vehicle fuel system and allowing the fuel tank pressure to equilibrate to atmospheric pressure. In some examples, the method may further comprise: in response to fuel tank pressure equilibrating to atmospheric pressure, sealing the vehicle fuel system and assessing the ambient temperature. The method may further comprise: in response to an ambient temperature being outside of the threshold range, not operating a cooling fan to increase the fuel tank vacuum to identify leaks in the vehicle fuel system. The technical result of implementing this method is an EONV test that may be run at mild ambient temperatures which would not otherwise result in the development of adequate fuel tank vacuum to pass the EONV test. Implementing this method also increases the robustness of the EONV test, resulting in more accurate results and fewer false failures.

In another example, a method for a vehicle fuel system, comprising: sealing a fuel tank and monitoring a fuel tank pressure after an engine-off event; and in response to a change in fuel tank pressure during a monitoring period being less than a fuel tank pressure threshold, unsealing the vehicle fuel system and allowing the fuel tank pressure to equilibrate to atmospheric pressure; assessing an ambient temperature; in response to the ambient temperature being within a threshold range, sealing the vehicle fuel system; and operating a cooling fan to increase a fuel tank vacuum to identify leaks in the vehicle fuel system. The method may further comprise: in response to the ambient temperature being outside of the threshold range, sealing the vehicle fuel system; and not operating a cooling fan to increase the fuel tank vacuum to identify leaks in the vehicle fuel system. Operating a cooling fan to increase a fuel tank vacuum to identify leaks in the vehicle fuel system may further include: operating a cooling fan for a vacuum test duration, the vacuum test duration based on an amount of stored battery charge. The method may further comprise: in response to a fuel tank vacuum increasing above a vacuum threshold during the vacuum test duration, indicating that no leak has been detected. In some examples, the method may further comprise: in response to the fuel tank vacuum failing to reach the vacuum threshold during the vacuum test duration, indicating that a leak has been detected. The vehicle fuel system may include a fuel tank coupled to a canister, the canister coupled to an engine intake via a canister purge valve and further coupled to atmosphere via a canister vent valve, and wherein sealing the vehicle fuel system includes closing each of the canister vent valve and canister purge valve. Unsealing the vehicle fuel system may include opening the canister vent valve. The fuel tank pressure threshold may be based on one or more of a vapor pressure of fuel vapors in a vapor space of the fuel tank and a fill level of the fuel tank. The vacuum threshold may be based on a fill level of the fuel tank. The technical result of implementing this method is a reduction in the occurrence of false EONV test failures due to insufficient vacuum developing may be reduced. This in turn, will reduce unnecessary vehicle warranty care.

The systems described herein and depicted in FIGS. 1 and 2, and the method described herein and depicted in FIG. 3 may enable one or more systems. In one example, a vehicle system, comprising: an engine including an intake; a fuel system including a fuel tank, a fuel vapor canister, a first valve coupling the fuel vapor canister to the intake, and a second valve coupling the fuel vapor canister to atmosphere; a pressure sensor coupled to the fuel tank for estimating a fuel tank pressure; a temperature sensor externally coupled to the vehicle system for estimating ambient temperature; an engine cooling system including one or more cooling fans; and a control system including executable instructions stored in non-transitory memory for: during an engine-off condition, in response to an ambient temperature being within a threshold temperature range; closing the first valve and the second valve; activating the one or more cooling fans; and monitoring a fuel tank vacuum for a vacuum test duration to identify leaks in the fuel system. Monitoring a fuel tank vacuum to identify leaks in the fuel system may further comprises: in response to a fuel tank vacuum increasing above a vacuum threshold during the vacuum test duration, indicating that no leak has been detected; and in response to the fuel tank vacuum failing to reach the vacuum threshold during the vacuum test duration, indicating that a leak has been detected. The technical result of this system is a vehicle that avoids EONV test restrictions based on stored battery charge. EONV tests may be limited to monitoring vacuum development for a duration (e.g. 45 minutes) in order to maintain sufficient battery charge to restart the vehicle. This system increases the chances that a sufficient vacuum will develop following engine shut-off to correctly assess the presence of fuel system leaks within the testing duration.

Figure 4A:
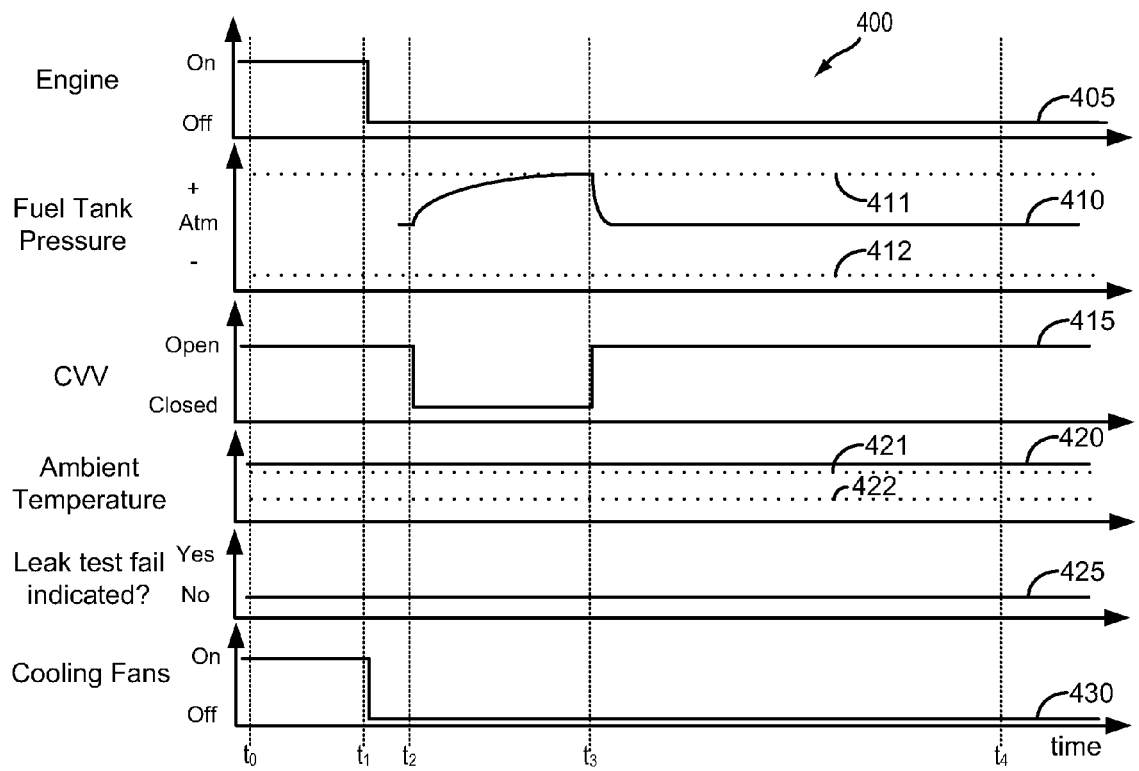
FIG. 4A shows a timeline for an example engine-off natural vacuum test.

FIG. 4A shows an example timeline 400 for an engine-off natural vacuum test using the method described herein and with regards to FIG. 3. Timeline 400 includes plot 405 indicating the status of an engine over time. Timeline 400 also includes plot 410 indicating the pressure inside a fuel tank over time. Timeline 400 also includes plot 415, indicating the status of a canister vent valve (CVV) over time; plot 420, indicating the ambient temperature over time; plot 425, indicating whether a leak test fail is indicated; and plot 430, indicating the status of engine cooling fans over time. Line 411 represents a first threshold for fuel tank pressure. Line 412 represents a second threshold for fuel tank pressure. Line 421 represents a first threshold for ambient temperature. Line 422 represents a second threshold for ambient temperature.

At $t_0$, the vehicle engine is on, as shown by plot 405. Accordingly, the cooling fan(s) are on, as shown by plot 430, and the CVV is open, as shown by plot 415. At time $t_1$, the vehicle engine is shut off, as shown by plot 405. Accordingly, the cooling fans are also turned off, as shown by plot 430. Entry conditions for an EONV test are met, and the test proceeds.

From time $t_1$ to time $t_2$, the temperature and pressure of the fuel system are allowed to stabilize. At time $t_2$, the CVV is closed, sealing the system, as shown by plot 415. The EONV test may then begin with the pressure rise portion of the test. In this example, the ambient temperature is higher than the first and second temperature thresholds, as shown by plot 420. With high ambient temperature, heat may continue to be rejected into the gas tank following engine shutoff. The fuel tank pressure thus continues to rise from $t_2$ to $t_3$. At $t_3$, the fuel tank pressure reaches the pressure rise threshold, depicted by line 411. This signifies a passing leak test. Accordingly, a leak test fail is not indicated, as shown by plot 425. The CVV is opened to vent the system. As such, the fuel tank pressure drops to atmospheric pressure, as shown by plot 410. With the pressure rise test passing, there is no need for the vacuum portion of the EONV test. The cooling fans are not turned on, as shown by plot 430. The test is thus completed in advance of the test run time limit, shown at $t_4$.

Figure 4B:
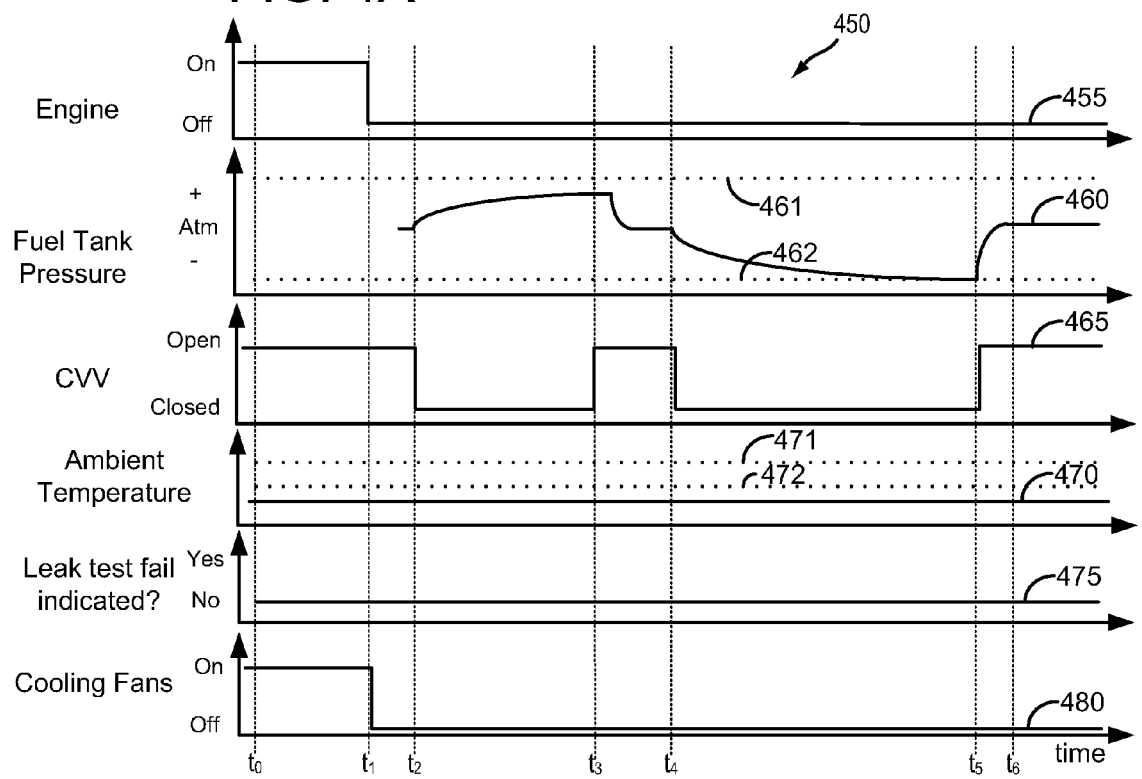
FIG. 4B shows a timeline for an example engine-off natural vacuum test.

FIG. 4B shows an example timeline 450 for an engine-off natural vacuum test using the method described herein and with regards to FIG. 3. Timeline 450 includes plot 455 indicating the status of an engine over time. Timeline 450 also includes plot 460 indicating the pressure inside a fuel tank over time. Timeline 450 also includes plot 465, indicating the status of a canister vent valve over time; plot 470, indicating the ambient temperature over time; plot 475, indicating whether a leak test fail is indicated; and plot 480, indicating the status of engine cooling fans over time. Line 461 represents a first threshold for fuel tank pressure. Line 462 represents a second threshold for fuel tank pressure. Line 471 represents a first threshold for ambient temperature. Line 472 represents a second threshold for ambient temperature.

At $t_0$, the vehicle engine is on, as shown by plot 455. Accordingly, the cooling fan(s) are on, as shown by plot 480, and the CVV is open, as shown by plot 465. At time $t_1$, the vehicle engine is shut off, as shown by plot 455. Accordingly, the cooling fans are also turned off, as shown by plot 480. Entry conditions for an EONV test are met, and the test proceeds.

From time $t_1$ to time $t_2$, the temperature and pressure of the fuel system are allowed to stabilize. At time $t_2$, the CVV is closed, sealing the system, as shown by plot 465. The EONV test may then begin with the pressure rise portion of the test. Fuel tank pressure may rise as heat continues to be rejected from the engine to the gas tank. The fuel tank pressure thus continues to rise from $t_2$ to $t_3$. At $t_3$, the fuel tank pressure reaches a plateau. The pressure at $t_3$ is less than the threshold for passing the pressure rise portion of the test, as depicted by line 461. The EONV test then proceeds to the vacuum test portion. The CVV is opened, allowing the fuel system to vent, and causing the fuel tank pressure to decrease to atmospheric pressure. When the fuel tank pressure has stabilized, at $t_4$, the CVV is again closed, sealing the system in preparation for the vacuum portion of the EONV test. As the fuel tank cools, a vacuum should develop in the absence of system leaks.

The ambient temperature, as shown by plot 470 is lower than the first and second temperature thresholds. As such, the cooling fans are not activated, as shown by plot 480. The cool ambient temperature allows the fuel tank pressure to drop from $t_4$ to $t_5$ as a vacuum is generated. At $t_5$, the fuel tank pressure reaches the vacuum threshold 462, as shown by plot 460. This signifies a passing vacuum test in advance of the test run time limit, shown at $t_6$. As such, a leak test fail is not indicated, as shown by plot 475. The CVV is reopened at $t_5$, as shown by plot 465, allowing the fuel system to vent, and allowing the fuel tank pressure to return to atmospheric pressure, as shown by plot 460.

Figure 5:
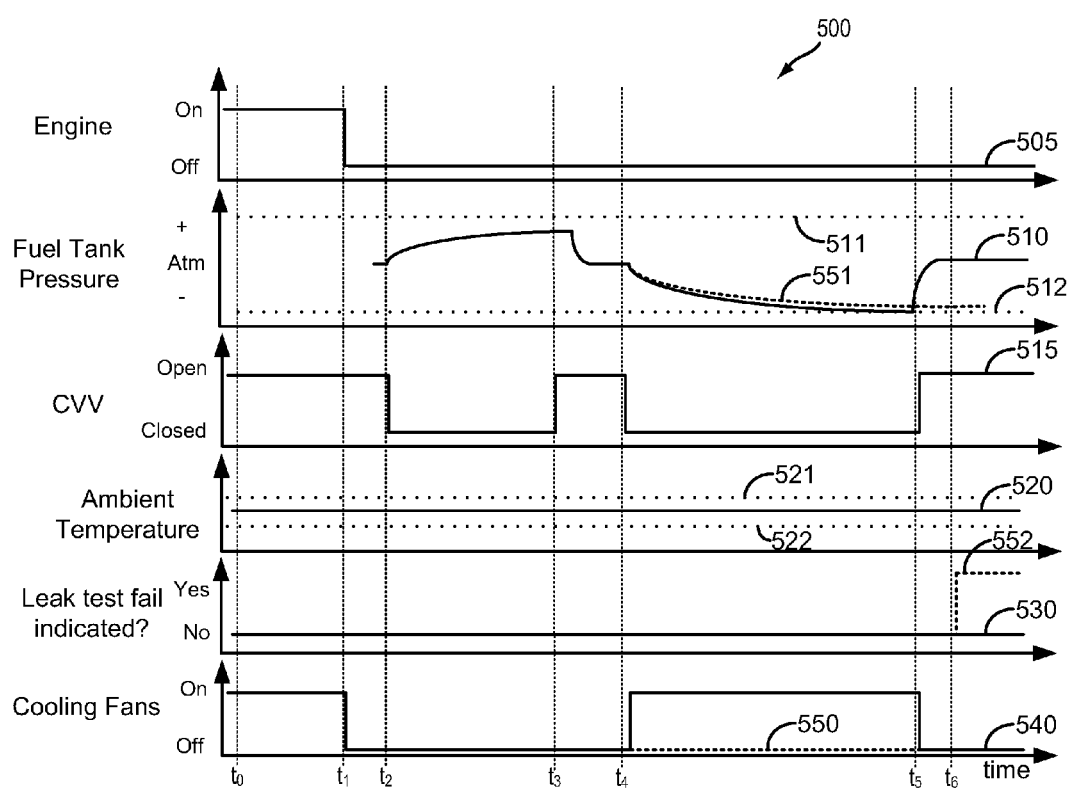
FIG. 5 shows a timeline for an example engine-off natural vacuum test.

FIG. 5 shows an example timeline 500 for an engine-off natural vacuum test using the method described herein and with regards to FIG. 3. Timeline 500 includes plot 505 indicating the status of an engine over time. Timeline 500 also includes plot 510 indicating the pressure inside a fuel tank over time. Timeline 500 also includes plot 515, indicating the status of a canister vent valve over time; plot 520, indicating the ambient temperature over time; plot 525, indicating whether a leak test fail is indicated; and plot 530, indicating the status of engine cooling fans over time. Line 511 represents a first threshold for fuel tank pressure. Line 512 represents a second threshold for fuel tank pressure. Line 521 represents a first threshold for ambient temperature. Line 522 represents a second threshold for ambient temperature. Plot 550 shows an alternate example, where cooling fans are not activated at time t4. Plot 551 indicates fuel tank pressure for this alternate example, while plot 552 indicates whether a leak test fail is indicated in this alternate example.

At $t_0$, the vehicle engine is on, as shown by plot 505. Accordingly, the cooling fan(s) are on, as shown by plot 530, and the CVV is open, as shown by plot 515. At time $t_1$, the vehicle engine is shut off, as shown by plot 505. Accordingly, the cooling fans are also turned off, as shown by plot 530. Entry conditions for an EONV test are met, and the test proceeds. From time $t_1$ to time $t_2$, the temperature and pressure of the fuel system are allowed to stabilize. At time $t_2$, the CVV is closed, sealing the system, as shown by plot 515. The EONV test may then begin with the pressure rise portion of the test. Fuel tank pressure may rise as heat continues to be rejected from the engine to the gas tank. The fuel tank pressure thus continues to rise from $t_2$ to $t_3$. At $t_3$, the fuel tank pressure reaches a plateau. The pressure at $t_3$ is less than the threshold for passing the pressure rise portion of the test, as depicted by line 511. The EONV test then proceeds to the vacuum test portion. The CVV is opened, allowing the fuel system to vent, and causing the fuel tank pressure to decrease to atmospheric pressure. When the fuel tank pressure has stabilized, at $t_4$, the CVV is again closed, sealing the system in preparation for the vacuum portion of the EONV test. As the fuel tank cools, a vacuum should develop in the absence of system leaks.

The ambient temperature, as shown by plot 520 is between the first and second temperature thresholds. As such, the cooling fans are activated, as shown by plot 530. The cooling effect of the fans allows the fuel tank pressure to drop from $t_4$ to $t_5$ as a vacuum is generated. At $t_5$, the fuel tank pressure reaches the vacuum threshold 512, as shown by plot 510. This signifies a passing vacuum test in advance of the test run time limit, shown at $t_6$. As such, a leak test fail is not indicated, as shown by plot 525. The CVV is reopened at $t_5$, as shown by plot 515, allowing the fuel system to vent, and allowing the fuel tank pressure to return to atmospheric pressure, as shown by plot 510.

In contrast, if cooling fans are not used (as indicated by plot 551) to facilitate fuel tank vacuum developing may indicate a false fail under conditions where ambient temperature is between the thresholds depicted by lines 521 and 522. Under mild temperature conditions, the fuel tank may not cool rapidly enough to develop threshold vacuum prior to the test run time limit, shown at $t_6$. As shown by plot 550, the rate of vacuum development in these examples is less than for the systems using the example method described herein. The vacuum does not reach the vacuum threshold prior to time $t_6$. Accordingly, a leak fail test would be indicated, as shown by plot 552, even if no leak were present in the system.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle fuel system, comprising:
   during an engine-off condition, including an ambient temperature within a threshold range, operating a cooling fan to increase a fuel tank vacuum including operating the cooling fan for a first test duration, the first test duration based on an amount of stored battery charge; and
   indicating leaks in the vehicle fuel system based on the increased vacuum.

2. The method of claim 1, further comprising:
   in response to a fuel tank vacuum increasing above a vacuum threshold during the first test duration, indicating that no leak has been detected.

3. The method of claim 1, further comprising:
   in response to a fuel tank vacuum failing to reach a vacuum threshold during the first test duration, indicating that a leak has been detected.

4. The method of claim 1, further comprising:
   following an engine-off event, sealing the vehicle fuel system and monitoring a fuel tank pressure for a second test duration.

5. The method of claim 4, further comprising:
   in response to the fuel tank pressure increasing above a pressure threshold during the second test duration, indicating that no leak has been detected.

6. The method of claim 4, further comprising:
   in response to the fuel tank pressure failing to reach a pressure threshold during the second test duration, unsealing the vehicle fuel system and allowing the fuel tank pressure to equilibrate to atmospheric pressure.

7. The method of claim 6, further comprising:
   in response to fuel tank pressure equilibrating to atmospheric pressure, sealing the vehicle fuel system and assessing the ambient temperature.

8. The method of claim 7, further comprising:
   in response to an ambient temperature being outside of the threshold range, not operating a cooling fan to increase the fuel tank vacuum to identify leaks in the vehicle fuel system.

9. A method for a vehicle fuel system, comprising:
   sealing a fuel tank and monitoring a fuel tank pressure after an engine-off event; and
   in response to a change in fuel tank pressure during a monitoring period being less than a fuel tank pressure threshold,
      unsealing the vehicle fuel system and allowing the fuel tank pressure to equilibrate to atmospheric pressure;
      assessing an ambient temperature;
      in response to the ambient temperature being within a threshold range, sealing the vehicle fuel system; and
operating a cooling fan to increase a fuel tank vacuum to identify leaks in the vehicle fuel system.

10. The method of claim 9, further comprising:
in response to the ambient temperature being outside of the threshold range,
sealing the vehicle fuel system; and
not operating a cooling fan to increase the fuel tank vacuum to identify leaks in the vehicle fuel system.

11. The method of claim 10, where operating a cooling fan to increase a fuel tank vacuum to identify leaks in the vehicle fuel system further includes:
operating a cooling fan for a vacuum test duration, the vacuum test duration based on an amount of stored battery charge.

12. The method of claim 11, further comprising:
in response to a fuel tank vacuum increasing above a vacuum threshold during the vacuum test duration, indicating that no leak has been detected.

13. The method of claim 12, further comprising:
in response to the fuel tank vacuum failing to reach the vacuum threshold during the vacuum test duration, indicating that a leak has been detected.

14. The method of claim 9, wherein the vehicle fuel system includes a fuel tank coupled to a canister, the canister coupled to an engine intake via a canister purge valve and further coupled to atmosphere via a canister vent valve, and wherein sealing the vehicle fuel system includes closing each of the canister vent valve and canister purge valve.

15. The method of claim 14, where unsealing the vehicle fuel system includes opening the canister vent valve.

16. The method of claim 9, wherein the fuel tank pressure threshold is based on one or more of a vapor pressure of fuel vapors in a vapor space of the fuel tank and a fill level of the fuel tank.

17. The method of claim 13, wherein the vacuum threshold is based on a fill level of the fuel tank.

* * * * *